United States Patent
Renegar

(10) Patent No.: US 11,021,120 B2
(45) Date of Patent: Jun. 1, 2021

(54) UNIFORM DECELERATION UNIT

(71) Applicant: Tesseract Structural Innovations, Inc., Fayetteville, AR (US)

(72) Inventor: Henry L. Renegar, Fayetteville, AR (US)

(73) Assignee: Tesseract Structural Innovations, Inc., Fayetteville, AR (US)

( * ) Notice: Subject to any disclaimer, the term of this patent is extended or adjusted under 35 U.S.C. 154(b) by 0 days.

(21) Appl. No.: 16/386,071

(22) Filed: Apr. 16, 2019

(65) Prior Publication Data

US 2019/0308574 A1 Oct. 10, 2019

Related U.S. Application Data

(63) Continuation-in-part of application No. 15/529,017, filed as application No. PCT/US2015/062366 on Nov. 24, 2015, now Pat. No. 10,556,559.

(60) Provisional application No. 62/658,565, filed on Apr. 16, 2018, provisional application No. 62/083,403, filed on Nov. 24, 2014.

(51) Int. Cl.
*B60R 19/00* (2006.01)
*B62D 25/18* (2006.01)
*B62D 21/15* (2006.01)

(52) U.S. Cl.
CPC ............ *B60R 19/00* (2013.01); *B62D 21/152* (2013.01); *B62D 25/18* (2013.01)

(58) Field of Classification Search
CPC ... B60R 19/00; B60R 19/18; B60R 2019/002; B60R 2019/1866; B60J 5/0461; B62D 21/15; B62D 21/152; B62D 25/18

USPC ............. 296/187.03, 187.09, 187.1; 293/102
See application file for complete search history.

(56) References Cited

U.S. PATENT DOCUMENTS

| | | | |
|---|---|---|---|
| 4,190,275 A | 2/1980 | Mileti | |
| 4,822,011 A | 4/1989 | Goldbach et al. | |
| 4,934,751 A | 6/1990 | Shimada | |
| 5,547,737 A | 8/1996 | Evans et al. | |
| 5,906,410 A | 5/1999 | Dalinkiewicz | |

(Continued)

FOREIGN PATENT DOCUMENTS

| CA | 2422415 A1 | 9/2003 |
|---|---|---|
| DE | 10 2008 062505 A1 | 8/2009 |

(Continued)

OTHER PUBLICATIONS

Computer translation of JP 2007045352 (Year: 2007).*

(Continued)

*Primary Examiner* — Gregory A Blankenship
(74) *Attorney, Agent, or Firm* — Wolf, Greenfield & Sacks, P.C.

(57) ABSTRACT

An apparatus and method for improving the safety and performance of an automobile in crash events is disclosed. The safety device includes first and second crash pad regions and a connecting member region disposed between the first and second crash pad regions. At least a portion of the connecting member region is arranged to move in one of an upward and downward direction at the initial moment of a crash to absorb crash energy. The safety device is arranged to collapse on itself upon continuation of the crash. In some embodiments, the safety device collapses in a horizontal direction upon continuation of the crash.

31 Claims, 21 Drawing Sheets

(56) References Cited

U.S. PATENT DOCUMENTS

| | | | |
|---|---|---|---|
| 6,007,123 A | 12/1999 | Schwartz et al. | |
| 6,142,563 A * | 11/2000 | Townsend | B60N 2/4228 297/216.1 |
| 6,179,355 B1 * | 1/2001 | Chou | B60R 19/18 188/377 |
| 6,270,131 B1 | 8/2001 | Martinez et al. | |
| 6,286,867 B1 | 9/2001 | Braemig et al. | |
| 6,341,813 B1 | 1/2002 | Taghaddos | |
| 6,547,295 B2 | 4/2003 | Vismara | |
| 6,726,258 B1 | 4/2004 | Sundgren et al. | |
| 6,729,451 B2 | 5/2004 | Yamagiwa | |
| 6,758,507 B2 | 7/2004 | Tarahomi | |
| 6,840,301 B2 | 1/2005 | Nichol et al. | |
| 6,866,084 B2 | 3/2005 | Asholt et al. | |
| 6,932,146 B2 | 8/2005 | Nichol et al. | |
| 6,998,535 B2 | 2/2006 | Nichol | |
| 7,114,764 B1 | 10/2006 | Barsoum et al. | |
| 7,341,277 B2 | 3/2008 | Huttsell et al. | |
| 8,684,427 B2 | 4/2014 | Marur et al. | |
| 8,864,216 B2 * | 10/2014 | Nagwanshi | B62D 29/004 296/187.03 |
| 8,979,146 B2 | 3/2015 | Kano et al. | |
| 9,394,005 B1 | 7/2016 | Enders | |
| 10,556,559 B2 | 2/2020 | Renegar | |
| 2002/0012771 A1 | 1/2002 | Fiorinelli et al. | |
| 2002/0017805 A1 | 2/2002 | Carroll, III et al. | |
| 2002/0047281 A1 | 4/2002 | Hartel et al. | |
| 2002/0053805 A1 * | 5/2002 | Azuchi | B60R 19/18 293/102 |
| 2003/0030290 A1 | 2/2003 | Yamagiwa | |
| 2003/0141712 A1 | 7/2003 | Miyasaka | |
| 2004/0046404 A1 * | 3/2004 | Kim | B60R 19/18 293/133 |
| 2005/0218696 A1 | 10/2005 | Aase et al. | |
| 2006/0021697 A1 | 2/2006 | Riley et al. | |
| 2006/0082168 A1 | 4/2006 | Joosten et al. | |
| 2007/0096507 A1 | 5/2007 | Brunner et al. | |
| 2007/0176440 A1 * | 8/2007 | Henseleit | B60R 19/18 293/102 |
| 2008/0150273 A1 | 6/2008 | Sugiyama et al. | |
| 2008/0309103 A1 * | 12/2008 | Frederick | B60R 19/18 293/120 |
| 2009/0152901 A1 | 6/2009 | Takeuchi et al. | |
| 2009/0243315 A1 * | 10/2009 | Goldsberry | B60R 19/18 293/155 |
| 2009/0289465 A1 * | 11/2009 | Heo | B60R 19/18 293/120 |
| 2010/0201139 A1 * | 8/2010 | Hashimura | B60R 19/18 293/133 |
| 2011/0095549 A1 * | 4/2011 | Moen | B60R 19/18 293/132 |
| 2011/0101714 A1 | 5/2011 | Bator | |
| 2011/0121587 A1 * | 5/2011 | Handing | B60R 19/18 293/133 |
| 2011/0193369 A1 | 8/2011 | Wuest et al. | |
| 2011/0210579 A1 * | 9/2011 | Marur | B60Q 1/0491 296/187.03 |
| 2013/0134739 A1 * | 5/2013 | Harris | B62D 25/085 296/187.09 |
| 2013/0161932 A1 | 6/2013 | Murray | |
| 2013/0241218 A1 * | 9/2013 | Tsuchida | B60R 19/18 293/133 |
| 2014/0207340 A1 | 7/2014 | Kunsch et al. | |
| 2014/0375081 A1 | 12/2014 | Kuriyama et al. | |
| 2015/0158442 A1 | 6/2015 | Yun et al. | |
| 2015/0175093 A1 | 6/2015 | Vaughn, Jr. | |
| 2015/0307045 A1 * | 10/2015 | Matecki | B60R 19/023 293/122 |
| 2015/0367798 A1 | 12/2015 | Bobba | |
| 2016/0121826 A1 * | 5/2016 | Terada | B60R 19/18 293/102 |
| 2016/0280163 A1 * | 9/2016 | Matecki | E04C 3/06 |
| 2017/0028950 A1 | 2/2017 | Keller et al. | |
| 2017/0106429 A1 * | 4/2017 | Nakanishi | B21D 47/02 |
| 2017/0253202 A1 * | 9/2017 | Holderried | B60R 19/03 |
| 2017/0274848 A1 | 9/2017 | Renegar | |
| 2017/0327065 A1 * | 11/2017 | So | B60R 19/26 |
| 2018/0022397 A1 * | 1/2018 | Richardson | B62D 21/15 296/187.03 |
| 2018/0222416 A1 * | 8/2018 | Jadhav | B60R 19/18 |
| 2019/0152413 A1 | 5/2019 | Renegar | |
| 2019/0308574 A1 * | 10/2019 | Renegar | B60R 19/00 |
| 2020/0101912 A1 * | 4/2020 | Renegar | B60R 13/0861 |

FOREIGN PATENT DOCUMENTS

| | | |
|---|---|---|
| DE | 10 2009 035778 A1 | 3/2010 |
| EP | 1 464 547 A1 | 10/2004 |
| JP | H01-063479 A | 3/1989 |
| JP | H05-238418 A | 9/1993 |
| JP | 2000-264255 A | 9/2000 |
| JP | 2006-248284 A | 9/2006 |
| JP | 2007-045352 A | 2/2007 |

OTHER PUBLICATIONS

International Search Report and Written Opinion for International Application No. PCT/US2019/027741, dated Jul. 1, 2019.
[No Author Listed] CYMAT: Aluminum Foam Technology Applied to Automotive Design. 10 pages.

* cited by examiner

UNIFORM DECELERATION UNIT

CROSS REFERENCE TO RELATED APPLICATIONS

This application claims the benefit under 35 U.S.C. § 119(e) to U.S. Provisional Application Ser. No. 62/658,565, entitled "UNIFORM DECELERATION UNIT" and filed on Apr. 16, 2018, which is herein incorporated by reference in its entirety.

This application also claims priority under 35 U.S.C. 120 and is a continuation-in-part of U.S. application Ser. No. 15/529,017, entitled 'UNIFORM DECELERATION UNIT," which is a national stage filing under 35 U.S.C. § 371 of International Application No. PCT/US2015/062366, filed on Nov. 24, 2015, which claims the benefit under 35 U.S.C. § 119(e) to U.S. Provisional Application Ser. No. 62/083,403, entitled "UNIFORM DECELERATION UNIT FOR FRONTAL IMPACTS" and filed on Nov. 24, 2014, the contents of each of which are herein incorporated by reference their entireties.

FIELD

The disclosed embodiments relate generally to automobiles and more particularly to safety systems arranged to improve the performance of an automobile in frontal, rear, and side crashes.

BACKGROUND

Automobile accidents are an unfortunate reality in the world today. Every year, tens of thousands of accidents occur in the United States alone. These accidents can cause, at a minimum, a financial strain on the automobile's owner and insurance companies, and, in worst case scenarios, can result in the fatality of the driver and/or other occupants in the vehicle. In recent decades, the automotive industry has seen great advances in safety with innovations such as frontal air bags, side curtain airbags, electronic crash avoidance systems, and structural crumple zones to name a few. Still, with the safety innovations we have today, there is a demand to further improve the safety of automobiles.

With regard to crash situations where the impact is directed to the outer 25% of vehicles, such as in frontal impact crashes, automakers have resorted to two main strategies for improving their vehicles performance (e.g., in both the IIHS Small Overlap Front Impact Test and in real world accidents). These strategies include: (1) adding structure to the front corners of the vehicle between the front bumper and the panel at the aft side of the wheel well, and (2) designing structural members, such as the wheel and lower control arm, to fracture at a given load while flexing at loads of lesser energy. Such known strategies, however, do not provide a satisfactory solution in all aspects.

SUMMARY

According to one aspect, a safety system for improving an automobile's performance in real world and/or simulated crashes (e.g., for the IIHS Small Overlap Front Impact test) is disclosed. In some embodiments, the system, also referred to as a Uniform Deceleration Unit ("UDU"), dissipates the energy arising from a frontal impact through the UDU structure and corresponding wheel and tire assembly, and away from the lower dash panel and vehicle occupants. The UDU may be tailored to virtually every make and model of car, truck, van or sport utility vehicle, both new and existing.

According to one embodiment, a safety device includes first and second crash pad regions and connecting member region disposed between the first and second crash pad regions. At least a portion of the connecting member region is arranged to move in one of an upward and downward direction at an initial moment of a crash to absorb crash energy.

According to another embodiment, a system includes first and second crash pad regions, a connecting member region disposed between the first and second crash pad regions, wherein at least a portion of the connecting member region is arranged to move in one of an upward and downward direction at an initial moment of a crash to absorb crash energy, and an automobile having a wheel well.

According to still another embodiment, a method of improving the safety of an automobile in a crash via a safety device having first and second crash pad regions and a connecting member region disposed between the first and second crash pad regions is disclosed. The method includes, at an initial moment of a crash, moving at least a portion of the connecting member region of the safety device in one of an upward and downward direction to absorb crash energy.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
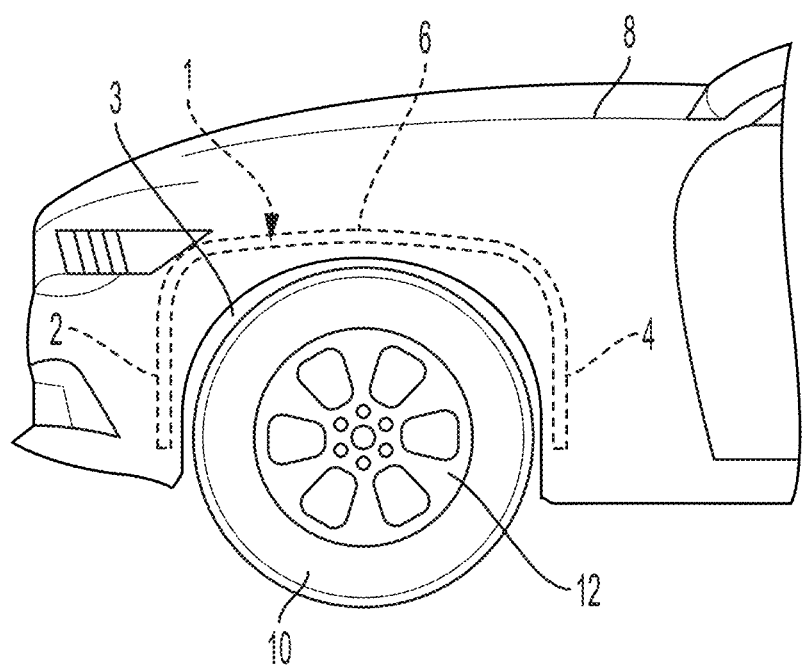
FIG. 1 illustrates the inventor's earlier-described Uniform Deceleration Unit installed in a wheel well of an automobile.

Automobile accidents are an unfortunate reality in the world today. Although the automotive industry has seen great advances in safety in recent decades with innovations such as frontal air bags, side curtain airbags, electronic crash avoidance systems, and structural crumple zones to name a few, there is still a demand to further improve the safety of automobiles. One recognized need is to improve vehicle design to further minimize injury to occupants resulting from a frontal crash.

Typically, automobiles do not have significant structural components in the region receiving the impact in small overlap frontal crashes. Unfortunately, without structural components to absorb and/or transmit the energy arising from an impact, the energy can be directed into the wheel and suspension components, which can be forced through the wheel well and into the driver compartment. As will be appreciated, current tests, such as the Small or Narrow Overlap Front Impact Test by the Insurance Institution for Highway Safety ("IIHS"), are interested in the intrusion of vehicular objects (e.g., as suspension components, wheel, and structural members) into the into the passenger compartment (e.g., the lower dash panel which is located by the driver's feet, and fire wall) as a result of a crash impact.

Traditionally, automakers have used two strategies to improve their vehicles' performance in both simulated and real world accidents. These strategies include: (1) adding structure to the front corners of the vehicle between the front bumper and the panel at the aft side of the wheel well, and (2) designing structural members, such as the wheel and lower control arm, to fracture at a given load while flexing at loads of lesser energy. Such known strategies, however, do not provide a satisfactory solution in all aspects.

The inventor has recognized a need for systems, structures, or devices that can be added to vehicles to absorb energy during a crash, such as in a front, side, or rear crash. The inventor has also recognized that advantages may be realized if such systems, structures, or devices minimize the need to make modifications to the vehicle, as well as minimize the reduction in fuel economy due to additional vehicle weight. In some embodiments, such systems, structures, or devices may have low mass and minimize vehicle package space, and/or have a short overall length. The inventor has further recognized that it may be advantageous if the cost of such additions to the vehicle to improve safety are relatively low. Finally, the inventor has recognized a need for safety systems, structures, or devices that can be customized for a specific vehicle.

In some embodiments, such a design may include a construction of lightweight materials, and may be capable of effectively absorbing energy arising from an impact and dissipating the energy away from the lower dash panel and occupants of the vehicle.

In some embodiments, the safety device absorbs energy arising from an impact and dissipates the crash energy with minimal deformation. For example, the safety device may be mounted in the wheel well of a vehicle. In such an example, in the event of a frontal crash or a rear crash, the safety device interacts with the tire and wheel assembly to maximize energy absorption and dissipation. It will be understood that the disclosed safety device may be applied in either or both of front and rear wheel wells.

In some embodiments, the safety device is customizable so that at least a portion of the device may move in an upward or downward direction, as needed by a particular vehicle, at the initial moment of the crash. Without wishing to be bound by theory, such upward or downward movement of the safety device may prevent the safety device from entering into the vehicle at the initial moment of the crash. In some embodiments, the device may be further arranged to crush and/or crumple on itself as the crash continues to absorb crash energy. In some embodiments, the device may crumple on itself in a horizontal, accordion-like manner. In some embodiments, the device may bulge in an upward or downward direction after the device crumples.

In some embodiments, the device is arranged to bring the crash force to a maximum tolerable level over a short displacement. As will be appreciated, such a device may be designed to achieve a specific peak force in the short displacement. In some embodiments, the device may be arranged to maintain the crash force level at or near the peak force for a specified displacement, such as while the device is crushed. In some embodiments, as will be described, the device includes a rib and web structure. In some embodiments, a foam material may be placed in one or more of the pockets of the rib and web structure. In such embodiments, since the foam may naturally become stiffer as the material crushes and becomes denser, the foam may be used to maintain the load and, thus, energy absorption, at or near the peak structure force for a specific displacement. In some embodiments, the device may absorb energy and deform up to or, in some embodiments, more than the size of the vehicle's wheel well.

According to one aspect of the present disclosure, the safety device includes a Uniform Deceleration Unit ("UDU") that can be incorporated into new and existing vehicles. In some embodiments, the UDU includes first and second crash pad regions and a connecting member region, such as a connecting beam, that connects the first crash pad region to the second crash pad region. In some embodiments, the first and second crash pad regions are individual components that are joined together via the connecting member region. In other embodiments, the first and second crash pad regions and the connecting member regions are different sections of a monolithic UDU. As will be appreciated, the first and second crash pad regions may include first and second crash pads in some embodiments.

As will be appreciated, the UDU may be fitted into the wheel well of a variety of different automobiles and may absorb a significant portion of the total crash energy of that automobile. In some embodiments, detailed geometries and materials of construction of the UDU can be tuned to increase or reduce the amount of crash energy absorbed, depending on the crush strength of other structural members to which the UDU is primarily attached. Depending on UDU design, the energy absorption can range from minimum of 10% of the total crash energy of the vehicle to approaching 100% of the total crash energy. For purposes herein, structural members may include items such as headlight frame, front bumper, fender, lower dash panel, A-pillar, rocker, steering wheel, amongst others.

In some embodiments, the UDU is arranged such that the movement of at least a portion of the connecting member region at the initial moment of the crash is controllable. For example, at least a portion of the connecting member region may move in an upward or downward direction at the initial moment of the crash. As will be appreciated, the direction of movement of the connecting member region may be selected based on the automobile into which the safety device is installed. The UDU also may be arranged to control movement of the connecting member region and crash pad regions as the crash continues and the crash load increases. For example, after moving slightly upward or downward, the connecting member region of the UDU may crush or crumple in a horizontal direction, such as horizontally like an accordion. As will be appreciated, in such embodiments, the UDU may be arranged such that the UDU deforms in a uniform manner as the crash load increases. The UDU may be further arranged to control the reaction forces of the crash pad region. For example, the UDU may be arranged such that the first or second crash pad regions do not generate upward reaction forces until downward motion of at least a portion of the connecting member region is achieved.

In some embodiments, the UDU may minimize deformation of the lower dash and inner driver compartment of the vehicle in the case of frontal crashes. The UDU also may minimize deformation of the side door in the case of side crashes, and the rear occupant compartment in the case of rear crashes. The UDU may further improve the safety of vehicle occupants by absorbing impact energy in such a way as to help minimize the overall crash forces generated.

In other embodiments, the UDU may be arranged to absorb crash energy in crash conditions where the crash pad regions are only partially crushed. For example, even in instances where there is reduced wheel well deformation, energy can still be absorbed by the UDU.

In some embodiments, the device may be designed to accommodate a particular shape of a vehicle. For example, one of the crash pad regions of the UDU may be shortened to match the ground height of the front of the vehicle.

Turning now to the figures, FIG. 1 illustrates the inventor's earlier-described UDU 1 that has been installed in a wheel well 3 of an automobile 8. Examples of different configurations of this UDU are described in International Application No.: PCT/US2015/062366, filed Nov. 24, 2015 and entitled "Uniform Deceleration Unit," which is incorporated by reference herein in its entirety. As will be appreciated, UDUs may be installed in a front wheel well, a rear wheel well, or in both front and rear wheel wells. In some embodiments, mounting holes may be used to attach UDUs to the automobile. As shown in FIG. 1, the UDU 1 may be used with a passenger car. As will be appreciated, UDUs may be used with all types of automobiles, including but not limited to: cars, trucks, sport utility vehicles, vans, busses, motorcycles, and crossover vehicles.

Figure 2:
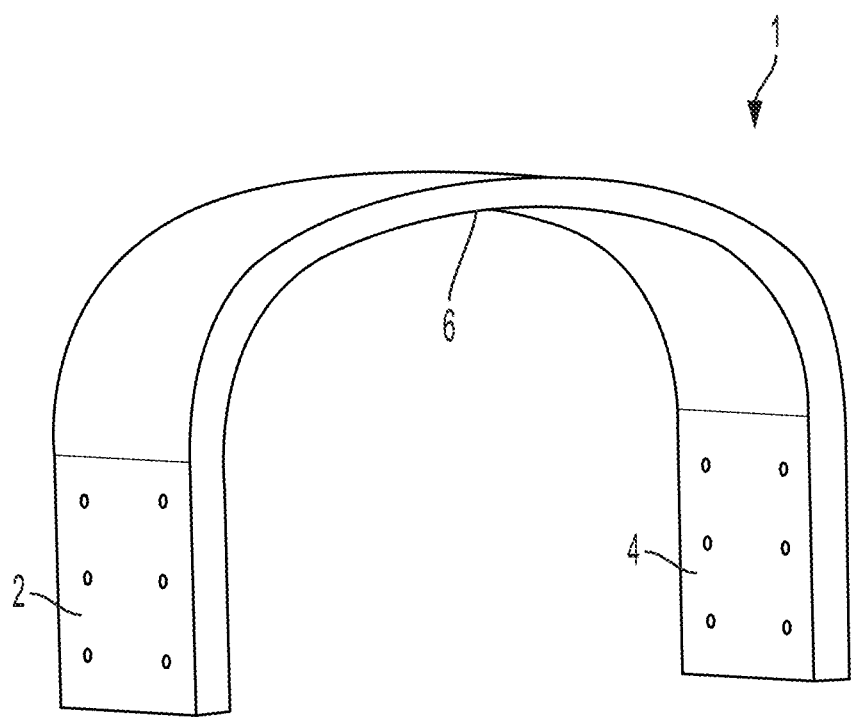
FIG. 2 is a perspective view of the Uniform Deceleration Unit of FIG. 1.

FIG. 2 shows a perspective view of the UDU 1 of FIG. 1, which may include light-weight structure that fits into one or more wheel wells of the automobile. As shown in this figure, the UDU 1 is an inverted "U"-shape and includes a first or forward crash pad 2, a connection beam 6, and a second or aft crash pad. As will be appreciated, in some embodiments, the UDU 1 may include multiple forward crash pads 2 and/or multiple aft crash pads 4, that are joined to the connection beam 6.

Figure 3:
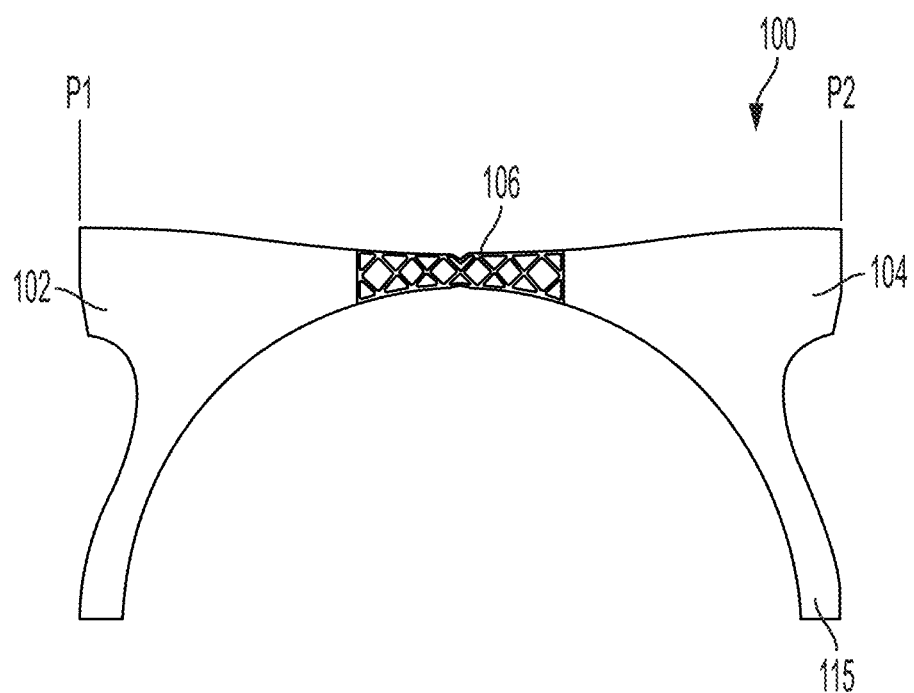
FIG. 3 is a front view of a Uniform Deceleration Unit ("UDU") according to embodiments of the present disclosure.

FIG. 3 illustrates an example of a UDU 100 according to aspects of the present disclosure. As shown in this figure, the UDU includes a first or front crash pad region 102, a second or aft crash pad region 104, and a connecting member region 106. In some embodiments, the connecting member region 106 extends between the first and second crash pad regions. In some embodiments, the connecting member region also may extend above at least a portion of one or more crash pad region.

In some embodiments, as shown in FIG. 3, the connecting member region extends substantially horizontally, with the crash pad regions being substantially vertically extending. In some embodiments, each crash pad region has a leg 115 which may be arranged at an angle relative to the connecting member region. In other embodiments, the legs of the crash pad region may be substantially perpendicular to the connecting member region.

In some embodiments, the connecting member region is located in a middle portion of the UDU. In some embodiments, the connecting member region is located in a central portion of the UDU. For purposes herein, being located in a central portion of the UDU means that the connecting member region is located equidistant between a plane P1 running through a first side of the UDU and a plane P2 running through the second side of the UDU. As will be appreciated, being located in the middle portion of the UDU means that the connecting member region is located between the two planes P1, P2 but not necessarily centered relative to the two planes. In some embodiments, as will be appreciated, the UDU may include a monolithic structure with each of the crash pad regions and connecting member region being components of the same, single structure. In other embodiments, the first and second crash pads regions may be separate components (e.g., first and second crash pads) that may be joined together via the connecting member region. For example, the UDU may be constructed as a composite of three or more sections. In such an example, each of the sections may be fabricated from one or more components, which may allow each of the sections to be designed with specific geometries and/or made from materials that would produce specific desirable crush behaviors.

Figure 4:
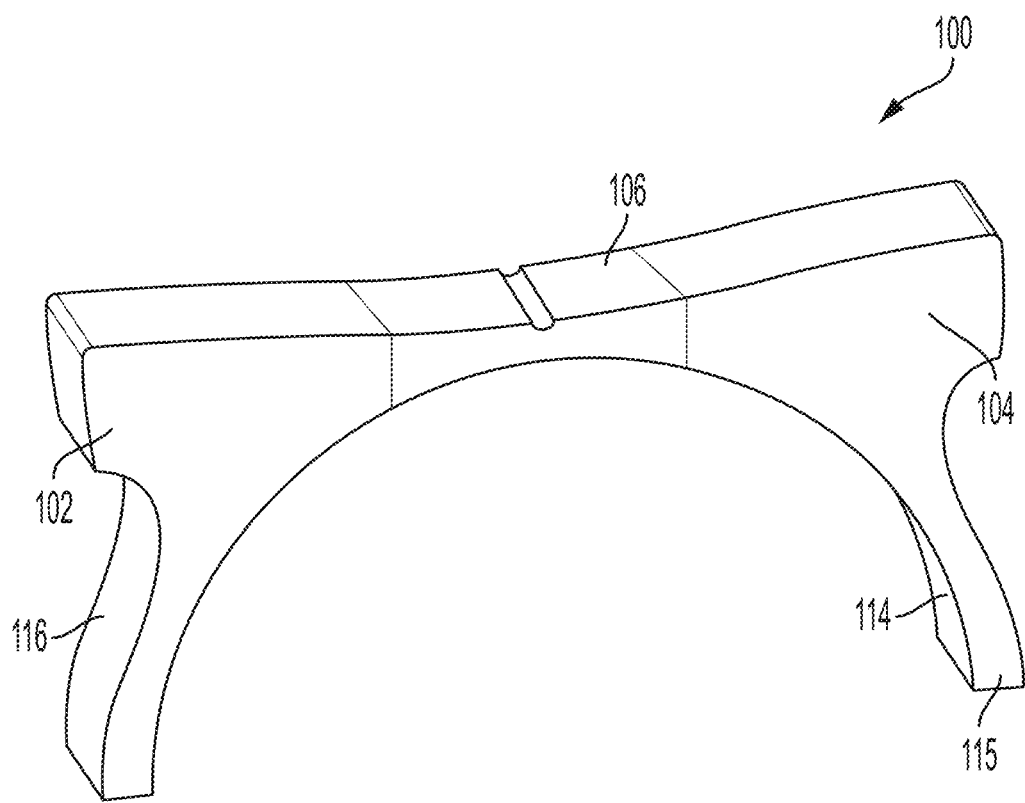
FIG. 4 is a perspective view of a UDU according to another embodiment.

As shown in FIGS. 3 and 4, similar to the inventor's earlier-described UDUs, the inner surface 114 of the UDU 100 of the present application may be arcuate in shape. That is, the inner surface of the UDU 100 may resemble and inverted "U"-shape. In some embodiments, as also shown in FIGS. 3 and 4, the outer surface 116 of the UDUs may have shapes that differ from that of the inner surface. For example, as shown in these figures, the overall shape of the UDU 100 is not an inverted "U"-shape. As will be appreciated, there may be one or more portions of the outer surface 116 of the UDU that are similar in shape (e.g., arcuate) to that of the inner surface 114 of the UDU even though the overall shape of the UDU is not an inverted "U"-shape. For example, a bottom portion of the leg 115 of each of the crash pad region 102, 104 may have curved inner and outer surfaces.

Although the UDUs in FIGS. 3 and 4 have substantially arcuate inner surfaces, it will be appreciated that the inner surfaces of the UDUs may have other suitable concave shapes. For example, one or more segments of the inner surface may be straight, with the opening having a substantially rectangular cross-sectional shape. In some embodiments, the shape of the inner surface of the UDU may correspond to the shape of the wheel well of an automobile. In a similar fashion, the outer surface may have any suitable shape and may correspond to the shape of the wheel well. For example, the outer surface may be substantially rectangular. In that regard, the shape of the UDU may vary from UDU to UDU depending upon the automobile into which the UDU is to be installed.

According to some embodiments, the UDU may be customized to accommodate a body structure of a vehicle. For example, in some embodiments, a vehicle may have a lower front end (e.g., clearance height) as compared to the hinge pillar, where the UDU may be attached. In such embodiments, the UDU may be formed to match the shape of the corresponding wheel well, or other portion of the vehicle where the UDU may be inserted. As will be appreciated, such a customized UDU may be asymmetrical about the longitudinal axis.

Figure 5A:
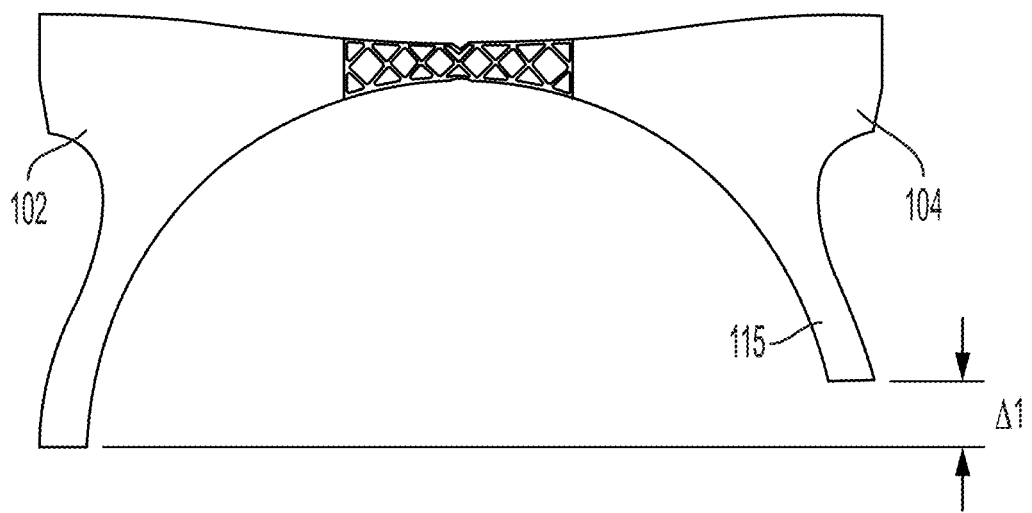
FIG. 5A is a front view of a UDU according to another embodiment.
Figure 5B:
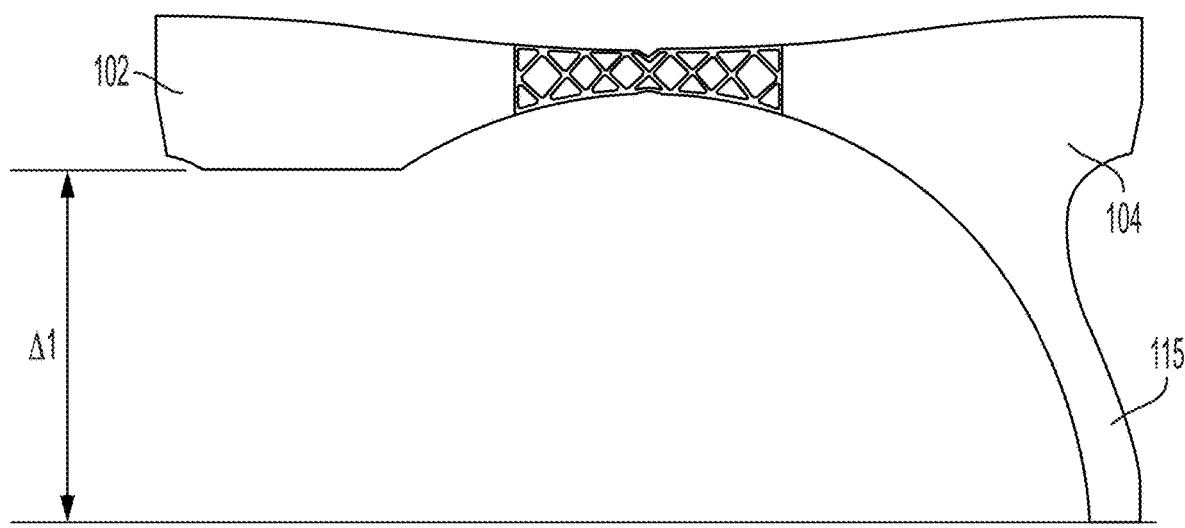
FIG. 5B is a front view of a UDU according to another embodiment.

In some embodiments, as shown in FIG. 5A, the leg 115 of the second crash pad region 104 may be shorter than the leg 115 of the first crash pad region (see the height difference labeled Δ1). Although the first crash pad region is shown as being longer than the second crash pad region in FIG. 5A, in other embodiments, as shown in FIG. 5B, the first crash pad region may be shorter than the second crash pad region (see the height difference labeled Δ1). In some embodiments, as illustrated in FIG. 5B, the first crash pad region may not include a lower leg 115.

As will be appreciated, the shorter crash pad region may be used as the front crash pad or the aft crash pad. In some embodiments, a shortened crash pad (e.g. a crash pad region with a leg) may be used as the front crash pad and may correspond to the vehicle front ground height.

Without wishing to be bound by theory, in some embodiments, the shorter crash pad region may have a reduction in energy absorption as compared to a full-length crash pad region. As will be appreciated in view of the present disclosure, the UDU may still absorb the same amount of energy or may absorb more energy as compared to UDUs with the same first and second crash pad regions, because of the combination of features incorporated into the UDU. For example, the UDU may still move upwardly/downwardly at the initial movement of the crash, even if a shorter first crash pad region is used.

Figure 6A:
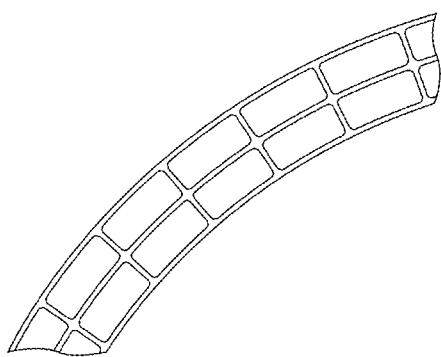
FIG. 6A is an enlarged view of a portion of the inventor's earlier-described UDU.
Figure 6B:
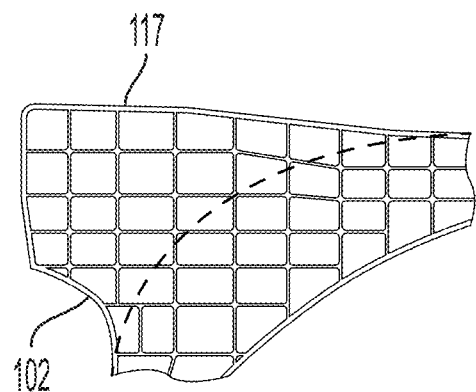
FIG. 6B is an enlarged view of a portion of a UDU according to an embodiment of the present disclosure.
Figure 6C:
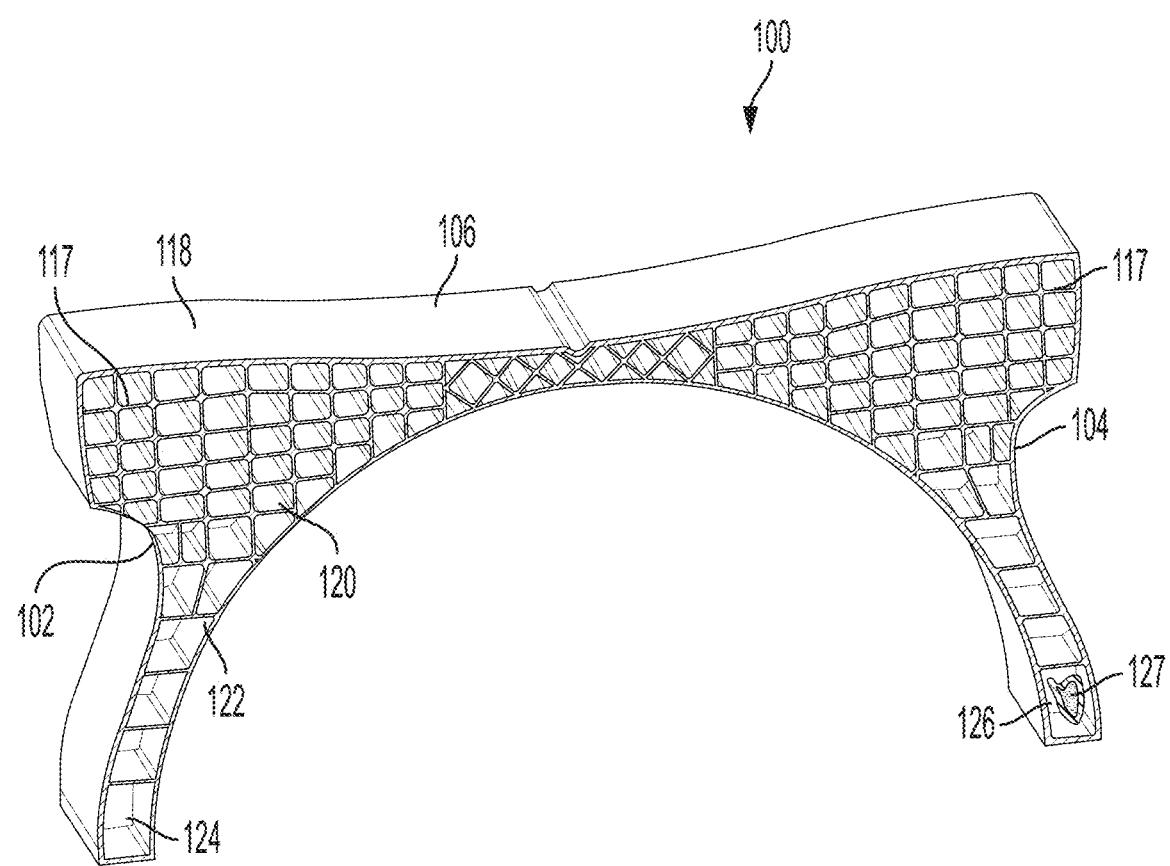
FIG. 6C is a perspective view of the UDU shown in FIG. 6B.
Figure 7A:
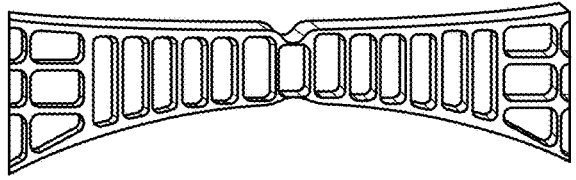
FIGS. 7A-7I illustrate exemplary geometric arrangements of connecting member regions of UDUs according to various embodiments.
Figure 7B:
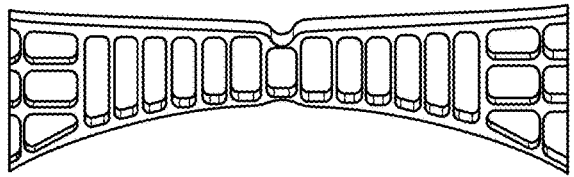
Figure 7C:
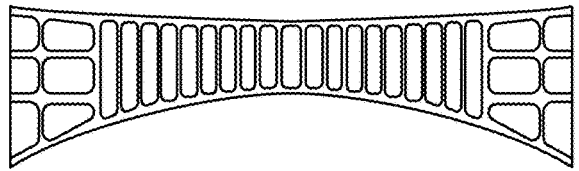
Figure 7D:
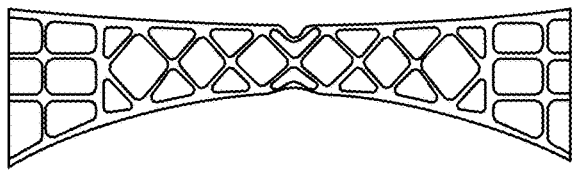
Figure 7E:
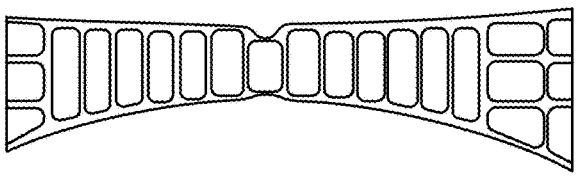
Figure 7F:
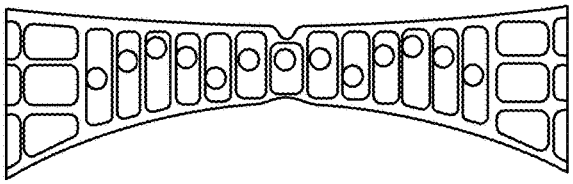
Figure 7G:
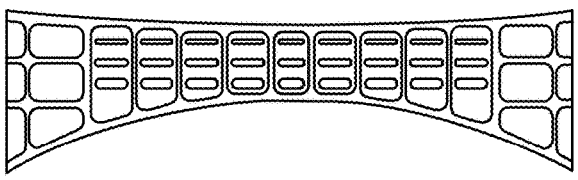
Figure 7H:
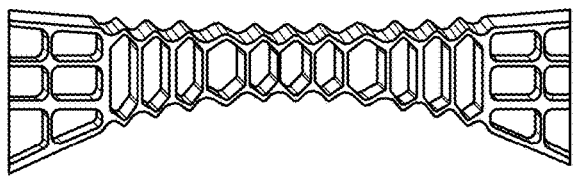
Figure 7I:
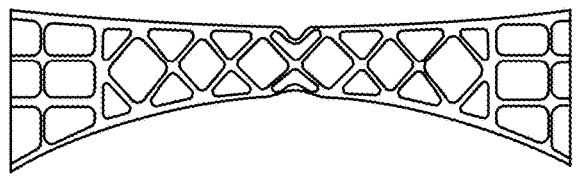

According to an aspect of the present disclosure, the UDUs may be customized to control the manner in which the UDU moves and collapses to absorb crash energy. In some embodiments, as shown in FIGS. 6B and 6C, one or more of the crash pad regions 102, 104 may have an extension 117 for absorbing crash energy. For purposes herein, the crash pad extension includes one or more sections of a crash pad region that extends outwardly beyond the inverse "U" shape of the inventor's earlier-described UDU. For example, FIG. 6A shows the inventor's earlier-described UDU with the inverse "U" shape and FIGS. 6B and 6C shows the UDU with an extension 117 that extends outwardly beyond the inverse "U" shape (see the dashed line in FIG. 6B). As will be appreciated, for the front or fore crash pad region, the extension is arranged to extend towards the front of the automobile when the UDU is installed. In a similar fashion, for the rear or aft crash pad region, the extension is arranged to extend towards the back of the automobile once installed.

As will be appreciated, the extension sections may have any suitable shape. For example, the extension sections may be substantially square, circular, semi-circular, triangular, other polygonal or other suitable shape.

In some embodiments, the crash pad extension may allow the UDU to absorb energy even in crash conditions in which the crash pads regions are only partially crushed, such as if the crash pad region was lodged in the wheel well. Without wishing to be bound by theory, by extending the crash pad regions in the fore and/or aft directions, more energy can be absorbed from the crash deformation. More energy can also be absorbed for reduced wheel well deformation with crash pad extension sections. For example, in some embodiments, 80% of energy can be absorbed by including extension sections.

In some embodiments, as also shown in FIG. 6C, the UDU, or regions of the UDU, may be formed of an outer skin 118 and an inner rib and web structure 120, which may serve as an energy absorption component of the UDU. In some embodiments, the outer skin extends along a periphery of the UDU. In some embodiments, the outer skin extends between the front face and rear face of the UDU. In some embodiments, the inner rib and web structure 120 includes one or more ribs 122 that extend between the front and rear faces of the UDU.

In some embodiments, the ribs extend only partially between the front and rear face of the UDU, while in other embodiments, the ribs may extend completely between the front and rear faces of the UDU. In some embodiments, the height of each rib, a distance between the top and bottom of each rib, may be the same for all ribs in the UDU, although the height of each rib may vary between the different regions of the UDU. For example, the height of the ribs in the crash pad regions may differ from the height of the ribs in the connecting member region. The height of the ribs also may vary from UDU to UDU.

The rib and web structure 120 may include any suitable arrangement. For example, as shown in FIG. 6C, the crash pad regions may have a rib and web structure with square and rectangular cross-sectional shapes. The rib and web structure also may include circular, oval, triangular, diamond, other polygonal or other suitable cross-sectional shape. As will be appreciated, the shape and arrangement of the rib and web structure in one portion of the UDU, such as the crash pad region, may differ from the shape and arrangement of the rib and web structure of the connecting member region.

As also shown in FIG. 6C, the rib and web structure may include one or more webs 124 that intersect the one or more ribs. In some embodiments, the webs are defined by the base (e.g., rear face) of the UDU, although the webs may be located and intersect the ribs at any point between the top and bottom of each ribs. For example, the webs may be located half way between the top and bottom of the ribs. As will be appreciated, although the webs are shown as being perpendicular to the ribs in FIG. 6C, in other embodiments, the webs may be arranged at an angle with respect to the ribs.

Figure 13A:
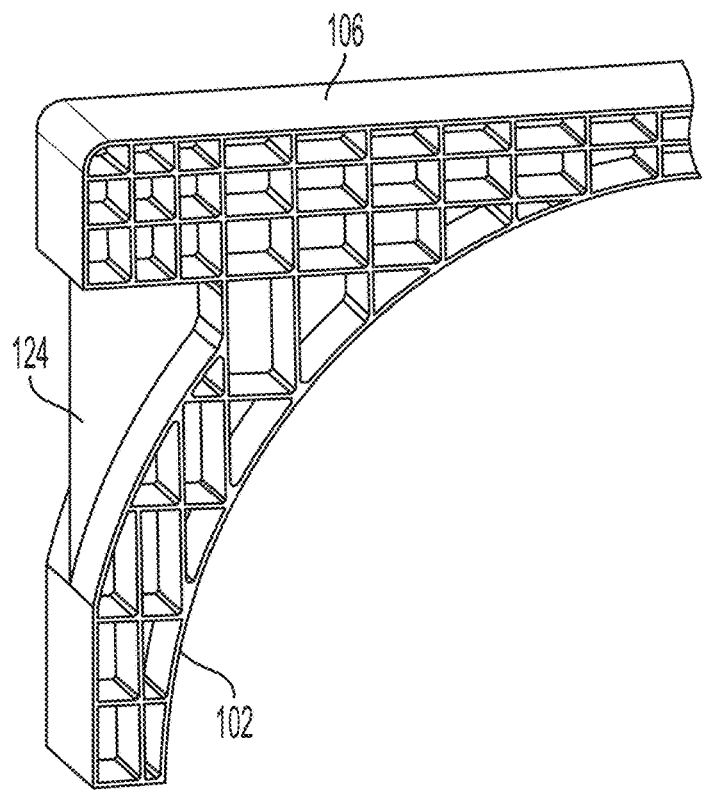
FIG. 13A is a perspective view of a portion of a UDU according to another embodiment and FIG. 13B is an isometric side view of the portion of the UDU of FIG. 13A.
Figure 13B:
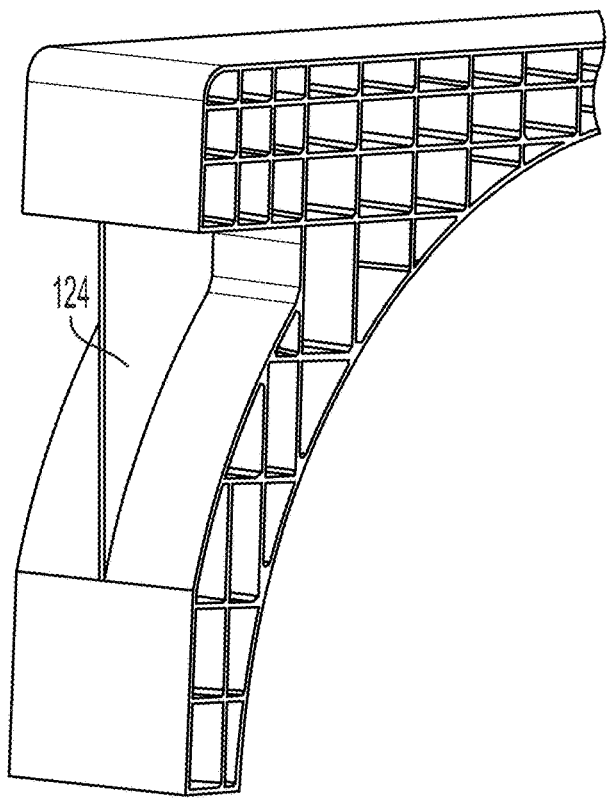

In some embodiments, as shown in FIGS. 13A and 13B, one or more crash pad regions may have webs that extend outwardly or axially from the skin 118 of the UDU. For example, a first or forward crash pad region may include an outwardly (e.g., forwardly) extending web to minimize motion between the crash pad region and the connecting member region. In some embodiments, such a web may help promote axial crush motion.

Figure 14:
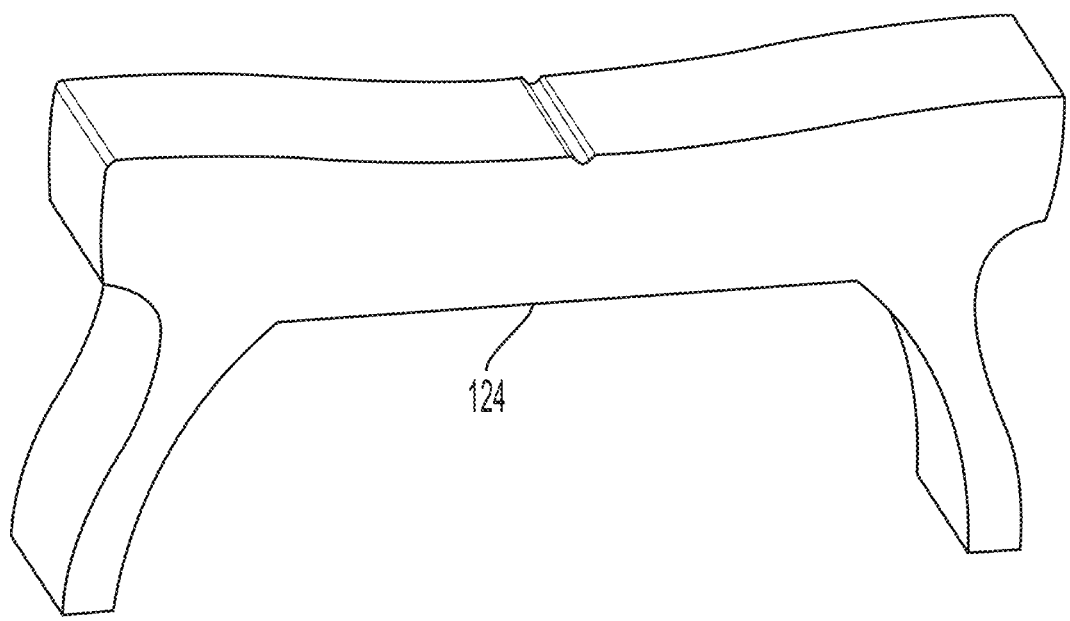
FIG. 14 is a perspective view of a UDU according to another embodiment.
Figure 15A:
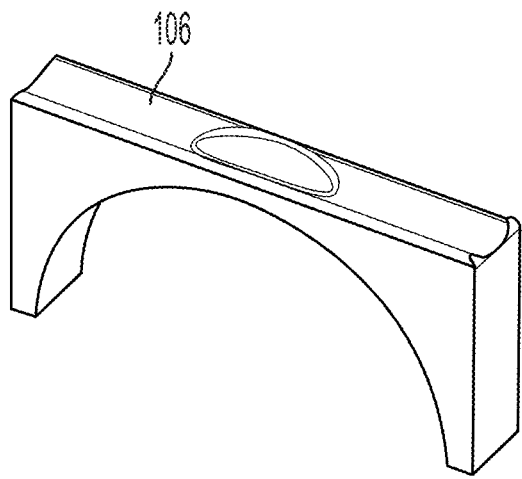
FIGS. 15A and 15B are perspective views of UDUs according to other embodiments.
Figure 15B:
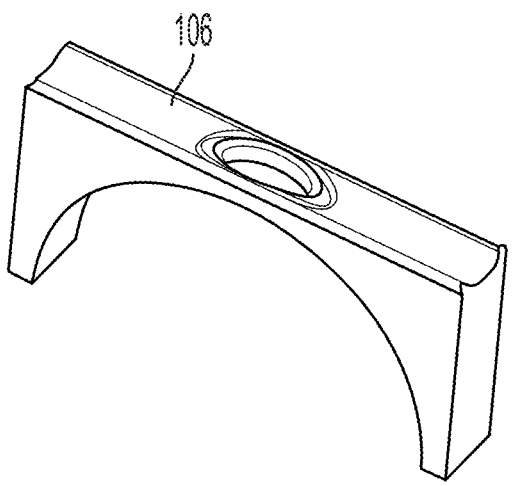

In some embodiments, as shown in FIG. 14, the UDU may include one or more drop side webs 124 which may help increase axial and torsional stiffness. These webs also may help to promote favorable axial crush motion (e.g., level accordion style crushing).

In some embodiments, the shape and arrangement of the rib and web structure may be chosen based on the automobile into which the UDU is to be installed and the desired level of energy absorption. For example, as shown in FIGS. 7A-7I, the shape of the rib and web structure in connecting member region may include circular, rectangular, oval, diamond, other polygonal or other suitable cross-sectional shapes. The geometries may be symmetric about a midpoint of the connecting member. The geometries also may be asymmetric. The geometries may include a repeating pattern or may include shapes in randomized array.

In some embodiments, such geometric arrangement may determine how the initial portion of the crush behaves. In one example, the desired crush sequence may be for the connecting member region to move slightly downward and then continue to crush horizontally like an accordion. The geometric arrangements of the rib and web structures in the connecting member regions shown in FIGS. 7A-7I may promote such a crush loading event.

In some embodiments, as shown in FIG. 6C, one or more pockets 126 are formed between the ribs, outer skin 118, and webs 124 of the UDU or region of the UDU. As will be appreciated, the size and shape of each pocket may be the same in some embodiments, although the shape and size of the pockets may vary from pocket to pocket. The size and shape of the pockets also may vary between regions of the UDU.

In some embodiments, the ribs and webs are formed from a ductile high strength, relatively low modulus material. This configuration may be fabricated by casting, forging, or other metal forming techniques. It may also be formed by additive technology processes. The matrix of ribs and webs could also be fabricated from a composite of engineered materials designed to give desired characteristics of strength and stiffness. For example, in some embodiments, the web structure may be covered with a high tensile strength material layer to help facilitate spreading of the crash force over a larger area of the crash pad.

In some embodiments, a porous material 127 may be inserted into one or more pockets. The porous material also may serve as an energy absorption component of the UDU. In some embodiments, the porous material is constructed of a very low density cellular material such as metallic foam or honey comb material. For example, the pockets may be filled with an aluminum foam. In some embodiments, the aluminum foam may be infused with nanoparticles. As will be appreciated, the pockets need not be completely filled with the porous material. For example, the foam may occupy only 15 percent of a volume of each pocket. As will also be appreciated, the same amount of porous material need not be inserted into each pocket. That is, a larger pocket may include more porous material than a smaller pocket. As will be further appreciated, porous material need not be inserted into each pocket. For example, porous material may be inserted into only half of the pockets in a given layer. As will be further appreciated, the porous material included in a first region of the UDU (e.g., a first crash pad region) need not be the same as the porous material in another region of the UDU (e.g., the connecting member region).

Figure 8:
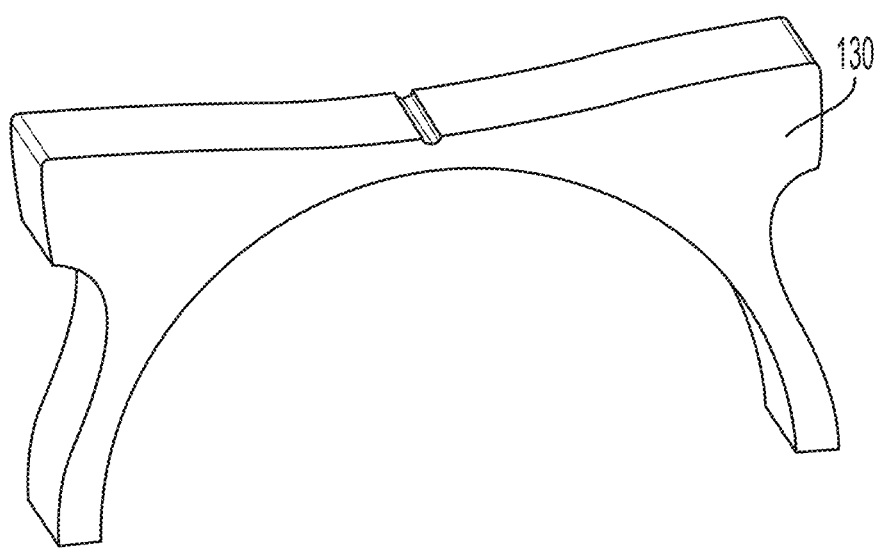
FIG. 8 is a perspective view of a UDU according to another embodiment.

In some embodiments, as shown in FIG. 8, the UDU may be covered by a plate 130. As will be appreciated, the UDU may include a plate on either the front or rear sides of the UDU. In some embodiments, the cover plate may provide additional axial stiffness in the crush direction. The cover plate also may cover the foam material inside the UDU, which may protect the foam from environmental exposure and mechanical damage.

Figure 9:
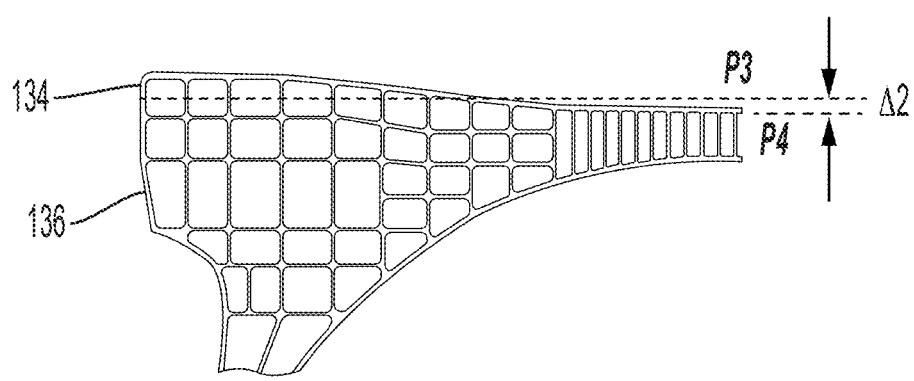
FIG. 9 is an enlarged view of a portion of a UDU according to another embodiment.

FIG. 9 illustrates other UDU arrangements that may be used to control the energy absorption and the behavior of the UDU during a crash event. For example, in some embodiments, the initial contact surface 134 of the first crash pad region may be positioned above the top of the connecting member region. As will be appreciated, the initial contact surface includes the portion of the UDU (e.g., on the first crash pad region 102) in which there is initial contact with the UDU during a crash event. In one such example, the initial contact surface may be raised above the center-most portion of the connecting member region of the UDU. The offset in position is illustrated by the difference (labeled 42) between the plane P3 running though the initial contact surface and the plane P4 running through the connecting member region. In some embodiments, the offset in position may be as small as ⅛ inch or 1/16 inch. The change in position also may be larger and may vary in other embodiments. Without wishing to be bound by theory, the offset need only be large enough to create an imbalanced force for the UDU to be capable of encouraging a desired motion of the connecting member region during the initial moment of the crash.

Figure 10:
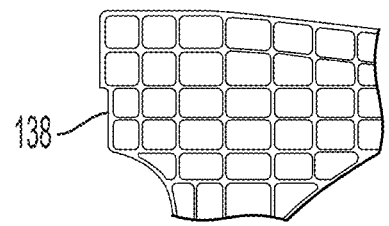
FIG. 10 is an enlarged view of a portion of a UDU according to yet another embodiment.

In some embodiments, raising the initial contact surface above the UDU connecting member region may encourage downward motion of the UDU connecting member region as the crash load increases. As the crash pad region crushes, additional contact with the crash pad region is established. In some embodiments, as shown in FIGS. 9 and 10, the area of the initial contact surface can be minimized. For example, the initial contact surface may be minimized via an undercut 136 (see FIG. 9.), a chamfer, or even steps 138 (see FIG. 10) in the front-facing surface of the first crash pad region (e.g., the fore crash pad region).

Figure 11A:
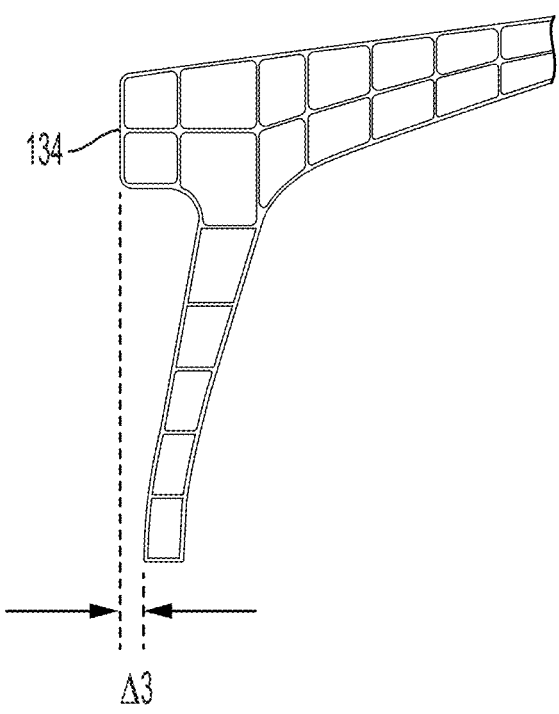
FIGS. 11A and 11B are enlarged views of portions of UDUs according to other embodiments.
Figure 11B:
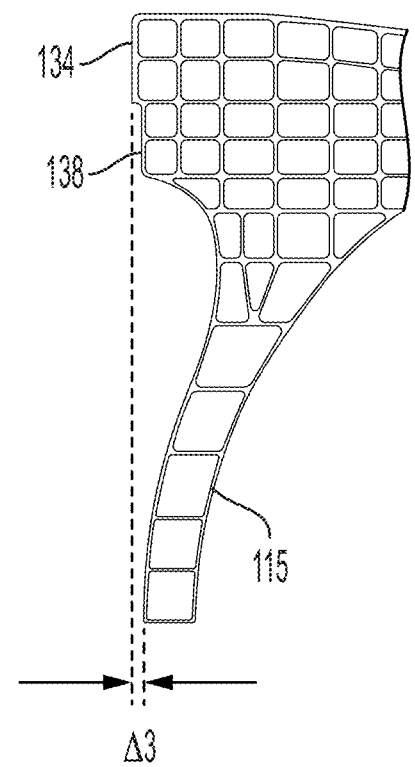

In some embodiments, as shown in FIGS. 11A and 11B, the initial contact surface 134 of a crash pad region, such as the first crash pad region 102, also may be offset with the lower leg 115 of the crash pad region (see the distance labeled 43). In some embodiments, this offset distance can prevent the lower leg 115 of the crash pad region from generating upwards reaction forces (e.g., such as those caused by contact with the lower leg during a crash) until downward motion of the UDU connecting member region is established. As shown in FIGS. 11A and 11B, varying degrees of offset between the initial contact surface and the lower leg may be implemented in the UDU. In some embodiments, the degree of the offset (and the position of the initial contact surface) may be reduced by including the undercut, chamfer, or even the step (see FIG. 11B), as previously described.

In some embodiments, if the lower leg 115 of the crash pad region is in the same plane as the initial contact surface of that crash pad region, the crash pad region may need one or more features (e.g., a rib and web structure or notch, as will be described) to cause the connecting member region to move in a downward direction at the initial moment of the crash.

Figure 12B:
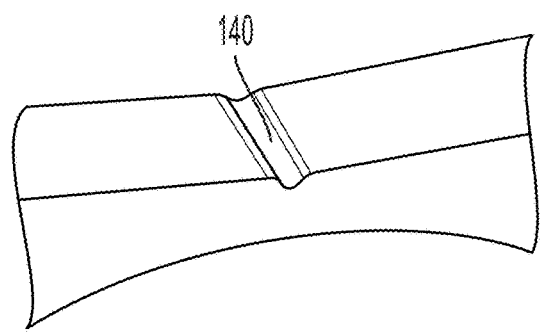
FIG. 12B is an enlarged perspective view of a portion of the UDU of FIG. 12A.
Figure 12A:
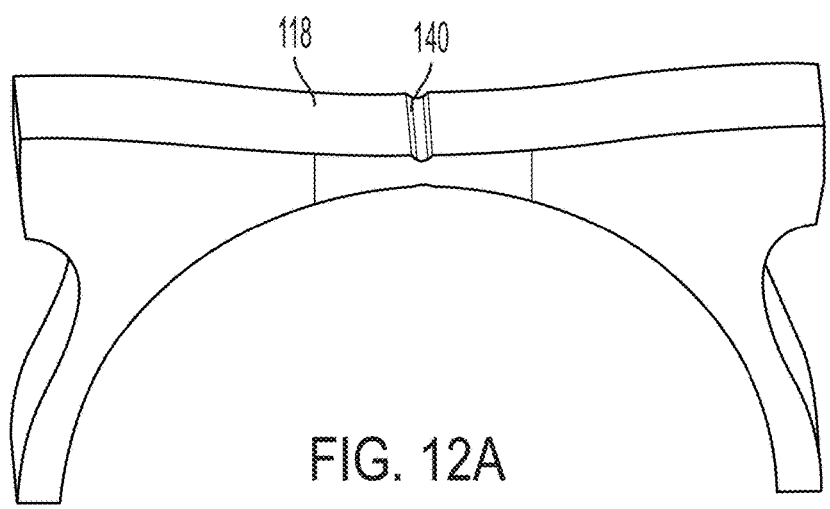
FIG. 12A is a top perspective view of a UDU according to another embodiment.

In still another embodiment, the UDU may include a notch or keyway 140 to control movement of the UDU during a crash and also energy absorption. As shown in FIGS. 12A and 12B, in some embodiments, the notch or keyway may be located in a portion of the connecting member region 106. For example, in one embodiment, the notch or keyway may be formed in the skin 118 of the top surface of the connecting member region. Although the notch is formed in the top surface of the UDU in FIGS. 12A and 12B, it will be appreciated that the notch may be formed in other suitable locations. For example, a notch may be formed on just the top, just the bottom, or on both the top and bottom of the connecting member region of the UDU. As will be appreciated, in UDUs where a notch is formed on the top and bottom of the connecting member region, the notches need not be vertically aligned, although in some embodiments the notches may be vertically aligned.

As will be appreciated, the notch or keyway may have any suitable cross-sectional shape. For example, the notch or keyway may have a circular, square, triangular, oval, rectangle, other polygonal or other suitable shape. The notch or keyway may extend along the entire length of the skin (e.g., from the front face to the rear face) or it may include only part way between the front and back of the skin.

In some embodiments, the notch or keyway is located at a central portion of the UDU. In such an embodiment, the notch may be located equidistant between the planes extending through the first side of the UDU and a plane extending through a second side of the UDU (see FIG. 3). In some embodiments, the notch or keyway may help control and encourage the initial direction of motion of the UDU connecting member portion. As described, the notch may cause the connecting member region to move either downward, as required for a specific vehicle, during the initial moment of the crash.

Although embodiments have been shown an described with one or more arrangements for controlling movement and behavior of the UDU and energy absorption, the UDU may have only one or may have two or more. For example, the UDU may have a notch and a rib and web structure (e.g., in the connecting member region). The UDU also may have a rib and web structure and an offset between the initial contact surface and the top of the connecting member portion. As will be appreciated, other combinations of designs are possible in other embodiments.

Figure 16A:
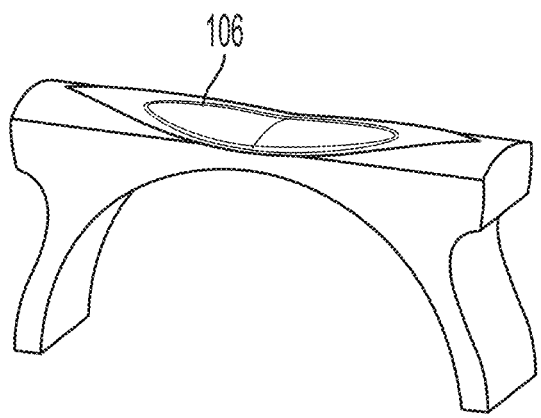
FIGS. 16A and 16B are perspective views of UDUs according to other embodiments.
Figure 16B:
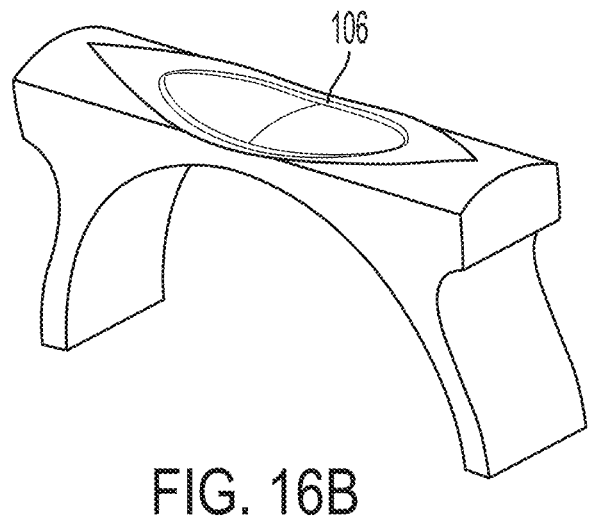
Figure 17A:
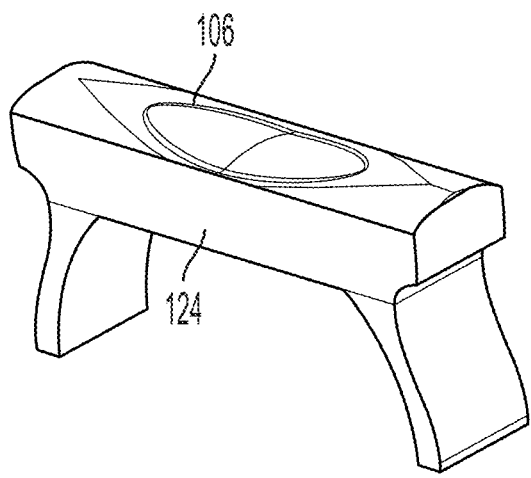
FIGS. 17A and 17B are perspective views of UDUs according to other embodiments.
Figure 17B:
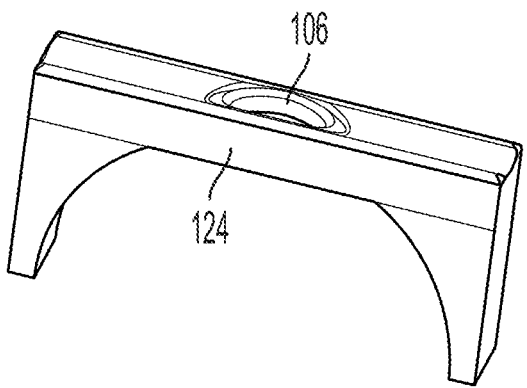

FIGS. 15A-15B, 16A-16B, and 17A-17B illustrate different arrangements the connecting member region may employ to have a shape that corresponds with the shape of the wheel well. Such arrangements also may be used to customize crush behavior. For example, in FIGS. 15A-15B, the top of the connecting member region may be contoured (e.g., concave) to fit the wheel well clearance. This shape also may be used to customize the crush behavior. In FIGS. 16A-16B, the UDU has a connecting member region formed into a saddle shape (e.g., convex) to follow the wheel well contour. The saddle shape may provide the maximum clearance to the tire-wheel assembly. The saddle shape also may maximizes the UDU connecting member region volume, which may maximize the energy absorption inside that specific space. FIGS. 17A and 17B show a hybrid UDU configuration that may be used to further maximize energy absorption for a given wheel well volume while maintaining a horizontal, accordion-style crush motion. In FIG. 17A, the connecting member region has a saddle shape and a drop side web 124. In FIG. 17B, the connecting member region has a contoured top shape and a drop web.

In some embodiments, the UDU has a height of about 0.2-1.0 meter, a length of about 0.5-2.0 meter, and a thickness of about 5-350 mm. As will be appreciated, the UDU also may have other suitable dimensions in other embodiments. In some embodiments, the forward crash pad region may have a thickness of about 5-200 mm and a length of about 0.1-1.0 meter. As will be further appreciated, the aft crash pad region may be the same size as the forward crash pad region, although the crash pad regions also may be different sizes. As will be further appreciated, although the front and aft crash pad regions are shown as being the same shape in these figures, the front and aft crash pad regions also may include different shapes. Mounting holes 5 may be used to attach the UDU to the automobile.

As will be appreciated by one skilled in the art, the individual components of a UDU may be fabricated from a wide variety of materials, using a wide variety of shaping methods, and joined into an assembly using a wide variety of generally available methods. Exemplary materials, though not limiting the scope of this disclosure, include alloys of aluminum known for having combination of high strength, low density, and relatively low cost; but also carbon fiber composites, polymer composites, metal matrix composites, layered composites including steel, and high-strength plastics. For example, crash pad regions may be constructed of a material having a mass per unit volume less than about 3,000 $kg/m^3$; yield strength of at least 180 MPa; and Young's modulus of at least 500 MPa. Cellular materials having porosity substantially greater than zero may be of particular interest for combination of high strength and low density. For example, crash pad regions may be constructed of a cellular material having a mass per unit volume less than about 1,000 $kg/m^3$. Exemplary shaping methods, though again not limiting the scope of the disclosure, include stamping, forging, casting, machining, and printing. Joining methods may include simple mechanical joining including crimping, screws or brads, ordinary welding, friction stir welding, addition of high-strength adhesives, or any combination of the above. As will be appreciated, while each component of the UDU may be made of the same material and/or by the same manufacturing technique, the components also may be made of different materials and/or by different manufacturing techniques.

Without wishing to be bound by theory, in a typical frontal crash not having the benefit of UDU, the crash impact is first absorbed by the vehicle's existing structure, such as by front bumper, headlight, and/or wheel well materials. Next, the force of impact propels these components rearward through the wheel well of the vehicle and into other components, such as through an inflated tire, a wheel assembly, a lower control arm (not shown), and a brake assembly (not shown). The result is that some of the automobile components are forced into a lower dash panel, an A-pillar and a steering wheel, penetrating the passenger compartment and potentially causing injury to the occupants.

In the event of a crash of an automobile having a UDU, the UDU interacts with the tire and wheel assembly to maximize energy absorption and dissipation and improve vehicle crash performance. In a normal, pre-impact state, the UDU is mounted in the vehicle's wheel assembly such that the UDU extends around a top half of the wheel. As will be appreciated, the UDU works interactively with the existing structural components of the vehicle wheel well.

Figure 18:
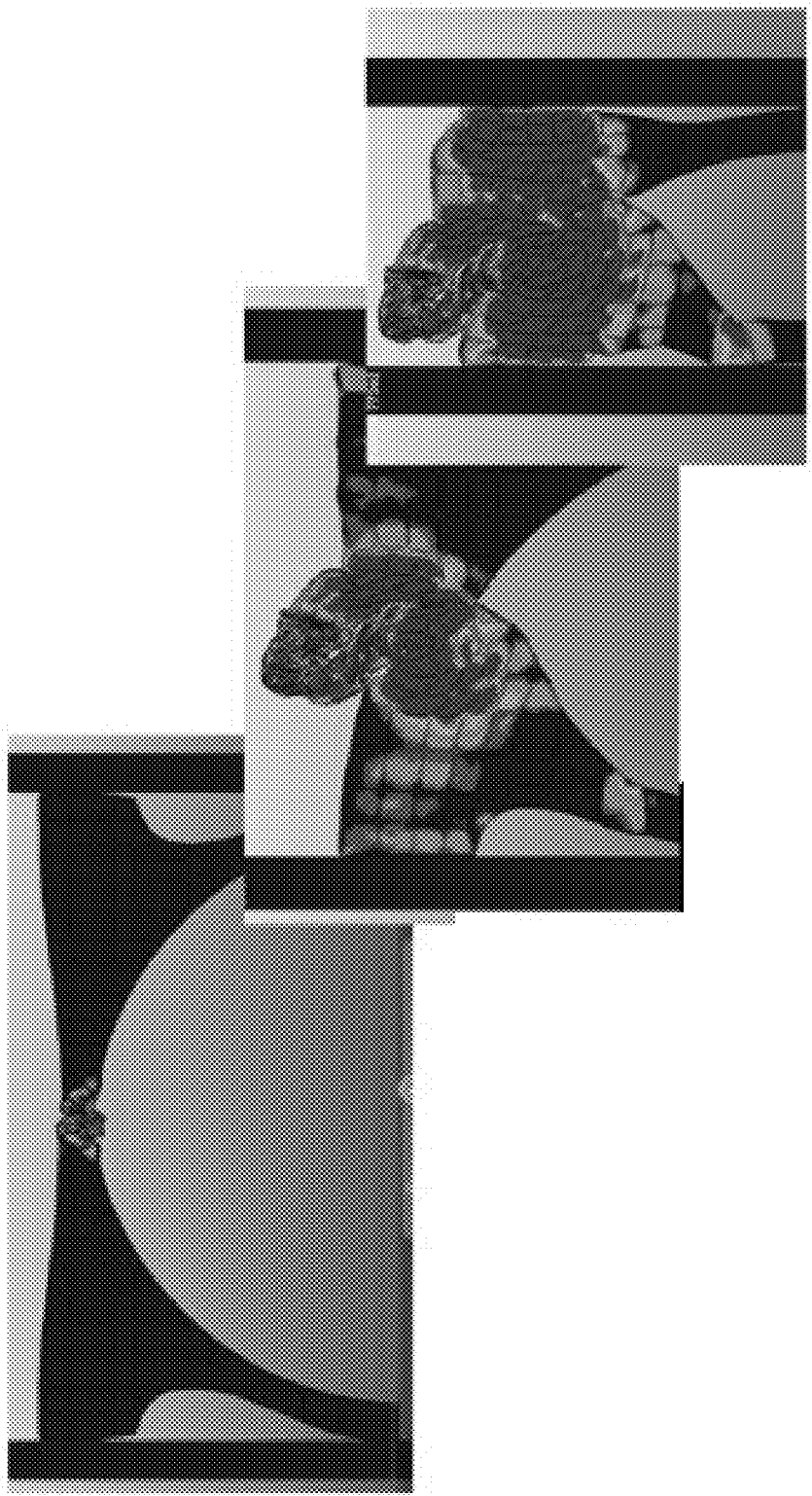
FIG. 18 illustrates a non-linear finite element analysis of a crash with a UDU according to embodiments of the present design.

In embodiments where a UDU is installed in the automobile, the initial crash impact is first absorbed by the existing vehicle components (i.e. headlight frame, front bumper, and fender), similar to frontal impacts where the UDU is not in place. However, as illustrated in FIG. 18, with a UDU in place, once the impact reaches the forward crash pad region, the forward crash pad region makes contact with the inflated tire and wheel assembly. In such a situation, as the force acting on the forward crash pad and inflated tire increases, the inflated tire will de-bead and lose air pressure. At this initial crash moment, part of the connecting member region (e.g., a central portion) may move either upwardly or downwardly, depending upon the configuration and the needs of the automobile.

Once air pressure is lost from inflated tire, the forward crash pad region may apply a load to the wheel assembly. In such a situation, as the load continues to increase, both the forward crash pad region and the wheel assembly will continue to deform.

As illustrated in FIG. 18 once a threshold amount of deformation has been reached, the connection beam will begin to crumple on itself. For example, the deformation may resemble a horizontally moving accordion. In some embodiments, the threshold amount of deformation of the UDU might be the point at which the front crash pad region makes contact with wheel assembly. In this situation, the forward crash pad region may push the wheel assembly and deflated tire into the aft crash pad region. In some embodiments, as the forward crash pad region and the aft crash pad region plastically deform, energy generated by the crash that passed into the wheel well region of the vehicle is absorbed and dissipated.

As will be appreciated, due to variations in design, the wheel assembly may or may not fracture at the point where the aft crash pad region is significantly deformed. However, as will be further appreciated, at this fracture point, much of the energy generated by the crash will have already been absorbed by both the existing structure of vehicle and the UDU. As such, intrusion into the lower dash panel and occupant space may be limited or even prevented.

Figure 19:
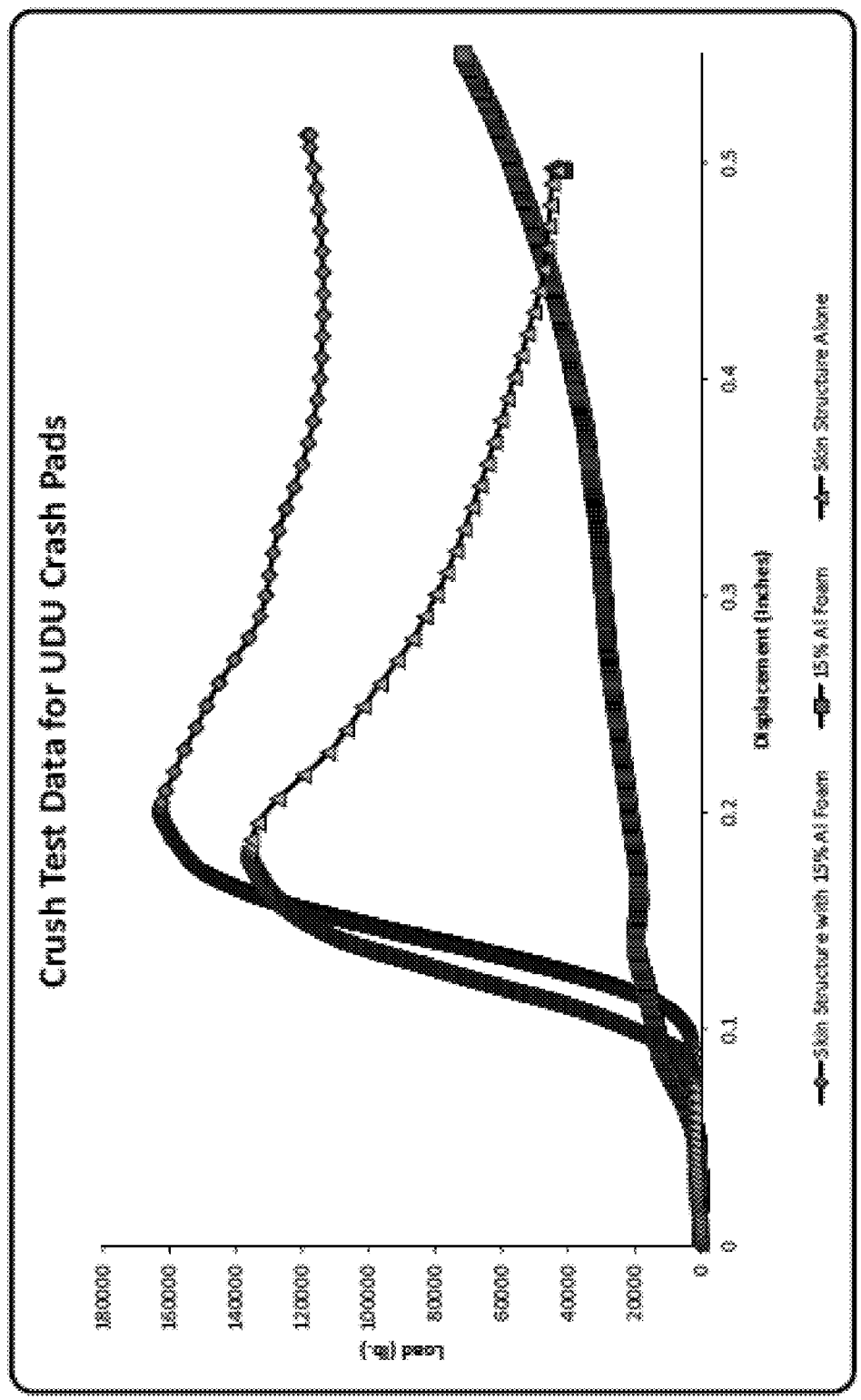
FIG. 19 illustrates crush test data for crash pads according to various embodiments.

Turning now to FIG. 19, which shows the data from a test performed on three different UDU assemblies having exactly the same cross-sectional area and the same one inch initial thickness. The first crash pad included 15% dense aluminum foam sandwiched between 2 parallel thin aluminum plates without the rib and web skin, the second crash pad included the rib and web aluminum skin without any foam and the third crash pad included the rib and web aluminum skin with 15% dense aluminum foam in all of the pockets in the skin structure. This load versus displacement data was collected from a test machine as the assemblies were individually crushed. The area under the curves corresponds to the energy absorbed by each of the structures due to the crushing.

The lowest curve in FIG. 19 (squares) was collected from crushing a cast 15% dense aluminum foam. As is shown, this curve has a low crush force at the beginning of the crush, but the crush force increases with increasing crush distance. The crush force for the aluminum foam was seen to increase significantly as the foam cells collapsed and the foam became increasingly more dense. Just beyond 0.6 inches of displacement a spike in crush force for the aluminum foam was observed.

The intermediate curve (triangles) was generated from crushing a rectangular skin box structure with axial ribs and webs inside the box. This box structure was constructed of 6061 T6 aluminum alloy. As can be seen from the graph in FIG. 19, the load for the skin structure spikes to a maximum (e.g., a peak load) at around 140,000 lbs., and then declines for the remainder of the crush sequence. As will be appreciated, energy is still able to be absorbed during the remainder of the crush sequence.

The top curve (diamonds) in FIG. 19 was collected from the crush of the 6061 T6 aluminum alloy skin with axial ribs and webs and 15% dense cast aluminum foam filling the rib and web pockets. As will be appreciated, more energy is absorbed by this configuration (e.g., there is a greater area under the load vs. displacement curve) as compared with the embodiments having only a rib and web structure (triangles) or only foam (squares).

In view of the data in FIG. 19, the inventors have realized that the crash pad regions and/or the connecting member region can be designed to achieve a specified peak force in a relatively short displacement when the one or more crash pad regions and/or the region connecting member region includes a rib and web structure. In embodiments in which foam is placed in the pockets of the rib and web structure, the characteristics of the aluminum foam, which may naturally become stiffer as the material crushes and becomes denser, may be used to maintain the load and, thus, energy absorption, at or near the peak structure force for a specified displacement. In some embodiments, the rib and web and foam arrangement may allow for displacement up to 30 inches. Such a foam also may minimize the mass required to deliver a unit of energy absorption.

As will be appreciated, the installation methodology of the UDU is consistent with the energy absorption properties of the UDU. For example, the placement of a UDU over the wheel assembly, as shown in FIG. 1, may allow the forward crash pad region to keep the inflated tire and wheel assembly in a longitudinal attitude as the inflated tire compresses and deflates during a crash. In some embodiments, the connecting member region will deform with the forward crash pad region in contact with the wheel assembly and deflated tire. As a crash proceeds, the connecting member portion may first deform elastically and then deform plastically. Such deformation may occur while the forward crash pad remains in contact with the deflated tire and wheel assembly. As will be appreciated, the constant contact between the forward crash pad region and deflated tire and wheel assembly may act to prevent the wheel assembly from rotating out of the wheel well during the crash.

In some embodiments, preventing such rotation may have the effect of diminishing the amount of energy absorbed by the wheel assembly. As will be appreciated, such rotation of the wheel assembly is a common problem with the performance of conventional designs in a crash situation. In fact, the wheel assembly is typically designed to be fracturable as a means to further dissipate energy, but such designs do not achieve the desired effect when the wheel assembly 12 rotates. Or, if the design is intended to rotate the wheel out of the wheel well during a crash in order to either engage the A-pillar or cut off the load path inside the wheel well, the tactic has limitations that depend on the complex kinematics of the crash.

In contrast, with the UDU, the forward crash pad region may maintain contact with the deflated tire and wheel assembly, and when the connecting member region is deformed, the wheel assembly may be pinned against the aft crash pad region. In such a situation, the aft crash pad region may plastically deform until wheel assembly fractures. As will be appreciated, when the aft crash pad region has deformed and the wheel assembly has possibly fractured, further force acting on the lower dash panel, A-pillar, and occupants will be minimized.

In some embodiments, mounting of a UDU to the vehicle can also be accomplished through mounting holes in the frontal crash pad region, aft crash pad region, and/or connecting member region. Mounting brackets may optionally be located on each of these components, and aligned to the wheel well, for the case of a frontal impact crash. The UDU may be fixed to the vehicle through any number of mechanical, physical, or chemical means, including but not limited to screws, bolts, rivets, glue, high strength adhesive, welding, or incorporation into an existing structural component of the vehicle, further including but not limited to shock tower, fender, bumper, or hood. In some embodiments, the forward crash pad region and the aft crash pad region are constructed of a very low-density cellular material such as metallic foam or honey-comb material. The connecting member region, may optionally be constructed of the same low-density cellular material as the crash pads. In one embodiment, the connecting member region may be constructed of a high strength material having a low Young's modulus, allowing it to undergo significant plastic deformation to absorb significant energy without breaking or fracturing. The connecting member region may be straight or may be curved up, down, left, or right.

The forward crash pad region, aft crash pad region and connecting member region, may be either constructed separately and then assembled, or constructed as a single monolithic structure. In some embodiments, the forward crash pad region, aft crash pad region and connecting member region, can be constructed by extrusion, casting, forging, or other metal forming techniques.

As will be appreciated, although embodiments are shown and described with a metallic foam being inserted into one or more pockets of the rib and web structure, it will be appreciated that other energy absorbing materials may be integrated into the one or more pockets. For example, an array of thin-walled tubes may be inserted into one or more pockets. Tube arrays can be either a single layer, double layer, or multiple layers, using a material or materials that have high ductility, high strength, and relatively low modulus. Tube array may be composed of thin-walled tubes having a cross section of circular, rectangular, or another closed geometric or organic shape. The thin-walled tubes may be filled with a very low density cellular material such as metallic foam or honey-comb material. The tubes may also be filled with an expanding polymer foam. Thin-walled tubes may be sandwiched between layers of light-weight, high-strength material. The internal structure of the thin-walled tubes may buckle as tube array is crushed in a crash situation. Such configuration may be formed by a variety of methods including but not limited to extrusion, casting, forging, and other metal forming techniques. Tube array may be generated as one continuous part or it may be formed from multiple discrete thin-walled tubes joined together. Tube array can also be fabricated from a composite of engineered materials designed to give the desired properties of high ductility, high strength and relatively low modulus.

As will be appreciated, the UDU may be employed in a rear fender and wheel well to dissipate the energy arising from a rear impact. As will be appreciated, the UDU installed in the rear wheel well may interact with the wheel in much the same manner as the UDU installed in the front wheel well. In some embodiments, when the UDU is in place, the initial impact may be absorbed by the existing vehicle components (i.e. tail-light assemblies, rear bumper, and fender), similar to rear impacts where the UDU is not in place. However, with the UDU in place, once the impact reaches the aft crash pad region, the aft pad region is forced to make contact with an inflated tire and wheel assembly. As the force acting on aft crash portion and inflated tire increases, the inflated tire will de-bead and lose air pressure. Once air pressure is lost from inflated tire, the aft crash pad region will apply load to the wheel assembly. Both the aft crash pad region and wheel assembly will continue to deform as the load continues to increase. At a certain amount of deformation, the connecting member region will begin to plastically deform, allowing the aft crash pad region to push the wheel assembly and deflated tire into the forward crash pad region. As will be appreciated, the energy dissipation achieved by a UDU installed in the rear wheel well may be the same as that achieved by a UDU installed in the front wheel well.

Figure 20:
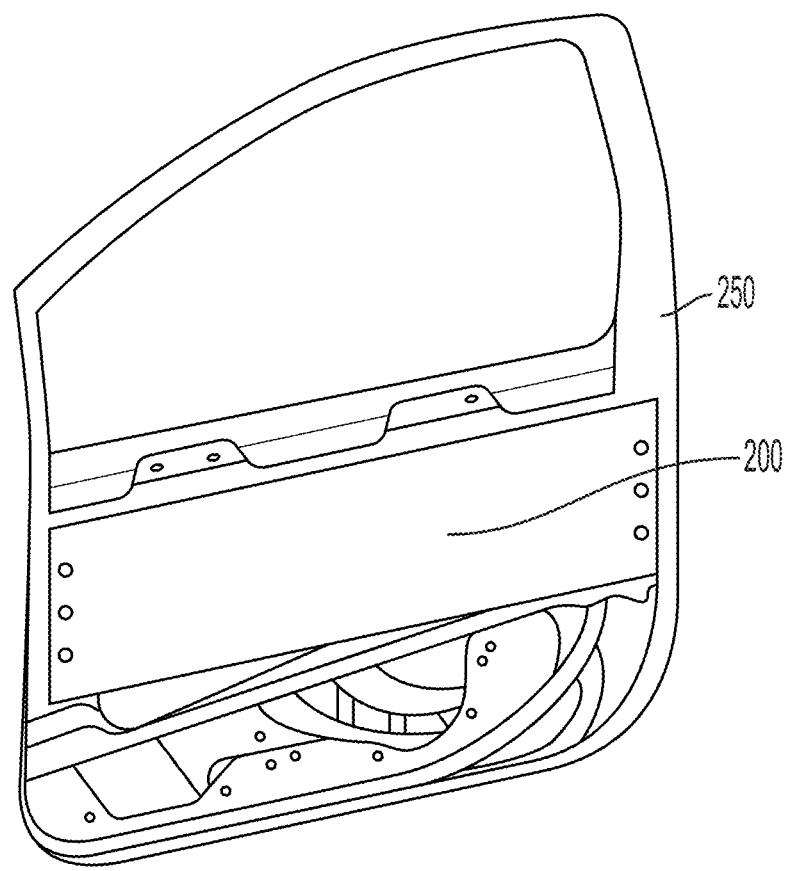
FIG. 20 shows an embodiment of a UDU installed in a door of an automobile according to embodiments of the present design.

Although embodiments are shown and described with the UDU being installed in a wheel well of an automobile to protect against frontal and rear crashes, the UDU 200 also may be installed in other regions of the automobile. For example, as shown in FIG. 20, the UDU may be installed in the side door 250 of the automobile to dissipate the energy arising from a side impact. Such a UDU may interact with the outer skin of the automobile and the pillar framing side door to distribute energy and minimize penetration of the passenger compartment and potential injury to occupants. In embodiments in which the UDU is installed into the automobiles front or rear doors, the UDU may be designed in the shape of a narrow, inverted UDU. In such embodiments, the first and second crash pad region may include inner and outer crash pad regions that are connected by the connecting member region. In such embodiments, the connecting member region may be shorter than the connecting member region for UDUs designed for the wheel well. In some embodiments, the inner crash pad region may be connected to the side door impact beam structures. The outer crash pad region may be connected the outer skin of the door. The side door UDU may provide a high strength composite barrier that may, as crash energy is absorbed, also act to prevent penetration of vehicle components through the side door and therefore will help prevent intrusion of vehicle components into the driver's space in the vehicle.

By way of elaborating but not limiting a UDU, specific illustrative methods of constructing crash pads, connection beam, and assembly are now discussed in more detail.

It may useful to treat forward crash pad region, aft crash pad region, and connecting member region as components of an assembly. In one embodiment, fabrication of one or more components involves a high-quality aluminum alloy die casting to produce the high-tensile strength skin layers. The casting is a rib and web design with primary load path ribs spanning the length of the UDU in the vehicle fore-aft direction. The primary load path ribs may be connected by perpendicular stringer ribs that are spaced as required by the structure loads. The function of the stringer ribs is to maintain spacing of the fore-aft ribs during the plastic deformation of a crash. The component may have a skin that is integrally cast in one of two configurations. The first involves cast pockets having a long dimension that is perpendicular to the fore-aft axis of the vehicle. The second configuration involves cast pockets having a long dimension that is parallel to the fore-aft axis of the vehicle.

The integral skin on both the inner and outer sides may be formed as part of a single casting, or alternatively only one of the inner and outer skins is formed as part of a casting, while the second skin may be bonded at a later assembly step using a high-strength adhesive. In this case, the skin acts as the "web" between the ribs. Low-density aluminum foam, for example having porosity between 80% and 94%, may be installed into the pockets of the skin and bonded in place by a high-strength adhesive. Aluminum foam can be applied in every pocket in the skin or it can be applied in every-other pocket in the skin or it can be applied in some other pattern to the pockets in the skin. The density of aluminum foam and the foam fill pattern in the cast skin may be optimized to balance cost against ability to dissipate crash impact energy.

Optional side openings on the skin might then be covered with aluminum plates shaped to cover the aluminum foam and seal the pocket openings. These cover plates are bonded to the cast skin and the aluminum foam using a high strength adhesive. The completed UDU assembly can optionally be coated to protect the assembly from moisture, road salt, engine fluids, dirt, gravel, and stones. The coating of choice is a poly-urea based tough coating.

In yet another configuration of a component, both the inner and outer skins are made as separate pieces. The inner and outer skins will sandwich an interior construction, which can be either low-density cellular materials without form, or a rib and web structure such as honeycombs or the like. In this case, pieces formed as aluminum foam or as other low-density cellular construction, with densities as determined by energy absorption requirements of the vehicle, are optionally bonded between the inner and outer skins using a high strength adhesive. The foam pieces can be spaced as determined by energy absorption calculations. The spaces between the aluminum foam pieces may be left empty or they may be filled with an expanding polymer foam. A polyurethane foam is one example of low-density cellular material. Application of such materials would have the effect of improving structural rigidity and reducing moisture infiltration into the structure.

As will be appreciated by one skilled in the art, the individual components of a UDU may be fabricated from a wide variety of materials, using a wide variety of shaping methods, and joined into an assembly using a wide variety of generally available methods. Exemplary materials, though not limiting the scope of this disclosure, include alloys of aluminum known for having combination of high strength, low density, and relatively low cost; but also carbon fiber composites, polymer composites, metal matrix composites, layered composites including steel, and high-strength plastics. For example, crash pads may be constructed of a material having a mass per unit volume less than about 3,000 kg/m$^3$; yield strength of at least 180 MPa; and Young's modulus of at least 500 MPa. Cellular materials having porosity substantially greater than zero may be of particular interest for combination of high strength and low density. For example, crash pads may be constructed of a cellular material having a mass per unit volume less than about 1,000 kg/m$^3$. Exemplary shaping methods, though again not limiting the scope of the disclosure, include stamping, forging, casting, machining, and printing. Joining methods may include simple mechanical joining including crimping, screws or brads, ordinary welding, friction stir welding, addition of high-strength adhesives, or any combination of the above. As will be appreciated, while each component of the UDU may be made of the same material and/or by the same manufacturing technique, the components also may be made of different materials and/or by different manufacturing techniques.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A safety device comprising:
   first and second crash pad regions;
   a connecting member region disposed between the first and second crash pad regions, wherein at least a portion of the connecting member region is arranged to move in a downward direction at an initial moment of a crash to absorb crash energy.

2. The safety device of claim 1, wherein the safety device is arranged to collapse on itself upon continuation of the crash.

3. The safety device of claim 2, wherein the safety device is arranged to collapse in a horizontal direction upon continuation of the crash.

4. The safety device of claim 1, wherein the first crash pad region includes a leg disposed at or near a distal end of the first crash pad region.

5. The safety device of claim 1, wherein an inner surface of the safety device includes an inverted "U" shape.

6. The safety device of claim 5, wherein a shape of the device is not an inverted "U" shape.

7. The safety device of claim 1, wherein at least a portion of the first crash pad region includes an outer skin and a rib and web structure disposed within the outer skin.

8. The safety device of claim 7, wherein the first crash pad region includes a web extending outwardly from the outer skin.

9. The safety device of claim 7, wherein at least a portion of the connecting member region includes an outer skin and a rib and web structure disposed within the outer skin.

10. The safety device of claim 9, wherein the rib and web structure of the first crash pad region is different from the rib and web structure of the connecting member region.

11. The safety device of claim 1, wherein at least a portion of the connecting member region includes an outer skin and a rib and web structure disposed within the outer web.

12. The safety device of claim 11, wherein a cross-sectional shape of the rib and web structure includes at least one of a circular, rectangular, oval, and diamond shape.

13. The safety device of claim 11, wherein the rib and web structure is symmetric about a midpoint of the connecting member region.

14. The safety device of claim 1, further comprising a plate, wherein the plate is disposed on one of a front side or a rear side of the safety device.

15. The safety device of claim 1, wherein the first crash pad region includes a contact surface, wherein the contact surface extends above the connecting member region.

16. The safety device of claim 15, wherein the second crash pad region includes a contact surface, wherein the contact surface of the second crash pad region extends above the connecting member region and is aligned with the contact surface of the first crash pad region.

17. The safety device of claim 1, wherein the connecting member region includes a notch formed in a top surface of the connecting member region.

18. The safety device of claim 17, wherein the notch extends along a width of the connecting member.

19. The safety device of claim 1, wherein the first and second crash pad regions and the connecting member region are integrally formed.

20. The safety device of claim 1, wherein the first and second crash pad regions and the connecting member region are separate components.

21. The safety device of claim 1, wherein the first crash pad region is longer than the second crash pad region.

22. The safety device of claim 1, further comprising one or more extension portions arranged to absorb crash energy, wherein the one or more extension portions extend from one of the first and second crash pad regions.

23. The safety device of claim 1, wherein a first extension portion extends outwardly from the first crash pad region and a second extension portion extends outwardly from the second crash pad region.

24. The safety device of claim 1, further comprising a first side web extending outwardly from the first crash pad region.

25. The safety device of claim 24, further comprising a second side web extending outwardly from the second crash pad region.

26. The safety device of claim 25, wherein the first side web is arranged to extend towards a front of an automobile and the second side web is arranged to extend towards a rear of the automobile when the safety device is installed in the automobile.

27. A system comprising:
first and second crash pad regions;
a connecting member region disposed between the first and second crash pad regions, wherein at least a portion of the connecting member region is arranged to move in a downward direction at an initial moment of a crash to absorb crash energy; and
an automobile having a wheel well;
wherein the first and second crash pad regions and the connecting member region are disposed in the wheel well.

28. A method of improving the safety of an automobile in a crash via a safety device having first and second crash pad regions and a connecting member region disposed between the first and second crash pad regions, the method comprising:
at an initial moment of a crash, moving at least a portion of the connecting member region of the safety device in a downward direction to absorb crash energy.

29. The method of claim 28, further comprising collapsing at least the connecting member region on itself upon continuation of the crash.

30. The method of claim 29, further comprising collapsing each of the first and second crash pad regions on itself upon continuation of the crash.

31. The method of claim 30, wherein collapsing the connecting member region and each of the first and second crash pad regions includes collapsing the connecting member region and each of the first and second crash pad regions in a horizontal direction upon continuation of the crash.

* * * * *